US011213805B2

(12) United States Patent
Mikhajlov et al.

(10) Patent No.: US 11,213,805 B2
(45) Date of Patent: Jan. 4, 2022

(54) CATALYST FOR THE CONVERSION OF NATURAL OR ASSOCIATED GAS INTO SYNTHESIS GAS IN AN AUTOTHERMAL REFORMING PROCESS AND METHOD FOR PREPARING THE SAME

(71) Applicant: ROSNEFT OIL COMPANY, Moscow (RU)

(72) Inventors: Sergey Aleksandrovich Mikhajlov, Moskovskaya oblast' (RU); Gilyana Evgen'evna Dzhungurova, Elista (RU); Nikolaj Aleksandrovich Mamonov, Moskovskaya oblast' (RU); Dmitrij Aleksandrovich Grigor'ev, Moskovskaya oblast' (RU); Mikhail Nikolaevich Mikhajlov, Moscow (RU)

(73) Assignee: Rosneft Oil Company, Moscow (RU)

( * ) Notice: Subject to any disclaimer, the term of this patent is extended or adjusted under 35 U.S.C. 154(b) by 0 days.

(21) Appl. No.: 16/470,190

(22) PCT Filed: Nov. 2, 2017

(86) PCT No.: PCT/RU2017/000811
§ 371 (c)(1),
(2) Date: Jun. 14, 2019

(87) PCT Pub. No.: WO2018/111148
PCT Pub. Date: Jun. 21, 2018

(65) Prior Publication Data
US 2020/0016578 A1 Jan. 16, 2020

(30) Foreign Application Priority Data

Dec. 15, 2016 (RU) .......................... RU2016149365

(51) Int. Cl.
| | |
|---|---|
| *B01J 23/40* | (2006.01) |
| *B01J 23/42* | (2006.01) |
| *B01J 23/89* | (2006.01) |
| *B01J 35/10* | (2006.01) |
| *B01J 37/03* | (2006.01) |

(Continued)

(52) U.S. Cl.
CPC ......... *B01J 23/892* (2013.01); *B01J 35/1009* (2013.01); *B01J 35/1014* (2013.01); *B01J 37/03* (2013.01); *B01J 37/08* (2013.01); *C01B 3/38* (2013.01); *C01B 2203/0244* (2013.01)

(58) Field of Classification Search
CPC .. B01J 23/892; B01J 35/1009; B01J 35/1014; B01J 37/03; B01J 37/08; B01J 23/83; B01J 23/755; B01J 32/00; B01J 35/1019; B01J 35/1038; B01J 37/16; C01B 3/38; C01B 2203/0244; C01B 3/36; Y02P 20/52

USPC ........................................................ 502/326
See application file for complete search history.

(56) References Cited

U.S. PATENT DOCUMENTS

| | | |
|---|---|---|
| 5,130,114 A | 7/1992 | Igarashi |
| 6,103,660 A | 8/2000 | Yperen et al. |

(Continued)

FOREIGN PATENT DOCUMENTS

| | | |
|---|---|---|
| EP | 1920830 A1 | 5/2008 |
| KR | 20040051953 A | 6/2004 |
| RU | 2185239 C1 | 7/2002 |

(Continued)

OTHER PUBLICATIONS

Ismagilov et al. "Nanoscale control during synthesis of Me/La2O3, Me/CexGd1—xOy and Me/CexZr1—xOy (Me=Ni, Pt, Pd, Rh) catalysts for autothermal reforming of methane" Catalysis Today vol. 210, Jul. 1, 2013, pp. 10-18 (Year: 2013).*

(Continued)

*Primary Examiner* — Haytham Soliman
(74) *Attorney, Agent, or Firm* — Mintz, Levin, Cohn, Ferris, Glovsky and Popeo, P.C.

(57) ABSTRACT

A catalyst in a calcined state has a specific surface area of 20-50 $m^2/g$ of catalyst, and a specific surface area of nickel metal after reduction of the catalyst of 8 to 11 $m^2/g$, wherein the average particle size of nickel metal is 3-8 nm, the dispersion of the particles is 10-16%, and the content of nickel is 5-15 wt. % based on the weight of calcined catalyst. A support has a specific surface area of 40-120 $m^2/g$ with a pore volume of the support of 0.2-0.4 $cm^3/g$, wherein the support is selected from a mixture of zirconium oxide and cerium oxide or magnesium oxide, cerium oxide and the ballast being zirconium oxide. The catalyst further contains a promoter selected from the group consisting of palladium and ruthenium, in an amount of from 0.01 to 0.5 wt. %. The catalyst is prepared by co-precipitation with ammonium hydroxide from a solution containing nickel, cerium and zirconium precursors and distilled water or from a solution containing nickel, cerium, zirconium, and magnesium precursors and distilled water, and having a pH of 8.0-9.0. The process is carried out under agitation at a temperature of 40-45° C. for 1-2 hours, followed by filtration, drying at a temperature of 100-110° C. for 6-8 hours, and calcining at a temperature of 400-650° C. for 4-6 hours. The invention provides a high average conversion of natural/associated gas of at least 90% in an autothermal reforming reaction of natural or associated gas, and a high synthesis gas output of at least 7000 $m^3/m^3_{cat} \cdot h$.

8 Claims, No Drawings

(51) Int. Cl.
*B01J 37/08* (2006.01)
*C01B 3/38* (2006.01)

(56) References Cited

U.S. PATENT DOCUMENTS

| 2011/0114892 A1 | 5/2011 | Jun et al. |
| 2012/0258857 A1 | 10/2012 | Pham et al. |

FOREIGN PATENT DOCUMENTS

| RU | 2475302 C2 | 2/2013 |
| RU | 2012144371 A | 4/2014 |
| RU | 2532924 C1 | 11/2014 |
| RU | 2638534 C1 | 12/2017 |
| WO | WO-2018/111148 A1 | 6/2018 |

OTHER PUBLICATIONS

Aksoylu, A.E. and Z.I. Onsan. "Hydrogenation of carbon oxides using coprecipitated and impregnated Ni/Al$_2$O$_3$ catalysts." Applied catalysis A: General, 164 (1997) 1-11.
Dong, W.-S. et.al. "Methane reforming over Ni/Ce—ZrO$_2$ catalysts: effect of nickel content." Applied Catalysis A: General, 226 (2002) 63-72.
International Search Report issued in International Application No. PCT/RU2017/000811, dated Feb. 21, 2018 (Feb. 21, 2018), 1 page. [English language].
International Search Report issued in International Application No. PCT/RU2017/000811, dated Feb. 21, 2018 (Feb. 21, 2018), 1 page. [Russian language].
Pengpanich, S. et al. "Methane partial oxidation over Ni/CeO$_2$—ZrO$_2$ mixed oxide solid solution catalysts." Catalysis Today 93-95 (2004) 95-105.
Potdar H.S. et al. "Carbon dioxide reforming of methane over co-precipitated Ni—Ce—ZrO$_2$ catalysts." Catalysis Letters. vol. 84 Nos. 1-2, Nov. 2002, pp. 95-100.
Written Opinion of the International Searching Authority issued in International Application No. PCT/RU2017/050100, Box No. V, dated Feb. 21, 2018 (Feb. 21, 2018) [English language translation of Box No. V at p. 5-6] 6 pages.
Ghani, A. "Hydrogen Production by the Catalytic Auto-Thermal Reforming of Synthetic Crude Glycerol in a Packed Bed Tubular Rector," Thesis for the Degree of Master of Applied Science, University of Regina, (2014), 208 pages.
Goma, D. et al. (Nov. 8, 2019), "Catalytic Performance of Ni/CeO$_2$/X—ZrO$_2$ (X=Ca, Y) Catalysts in the Aqueous-Phase Reforming of Methanol." Nanomaterials. 9(11):1582. 18 pages. htttps://doi.org/10.3390/nano9111582.
Karthikeyan, D. et al. (Published online Oct. 27, 2016, Issue Date May 2017), "Effect of preparation methods on structure and catalytic activity of Ni loaded Ce$_x$ Zr$_{1-x}$ O$_2$ catalysts for hydrogen production via autothermal reforming of ethane." Res Chem Intermed 43, 2817-2837. 21 pages. https://doi.org/10.1007/s11164-016-2796-0.
Muñoz, M.A. et al. (2017, e-published Jul. 29, 2017), "Highly stable ceria-zirconia-yttria supported Ni catalysts for syngas production by CO$_2$ reforming of methane," Applied Surface Science, vol. 426, pp. 864-873, ISSN 0169-4332, https://doi.org/10.1016/j.apsusc.2017.07.210.

\* cited by examiner

CATALYST FOR THE CONVERSION OF NATURAL OR ASSOCIATED GAS INTO SYNTHESIS GAS IN AN AUTOTHERMAL REFORMING PROCESS AND METHOD FOR PREPARING THE SAME

FIELD OF THE INVENTION

The invention relates to the field of gas chemistry and is directed to the production of synthesis gas from natural/associated gas in an autothermal reforming process, in particular, to a catalyst and a method for preparing an autothermal reforming catalyst.

BACKGROUND

In an autothermal reforming process, a mixture of natural/associated gas, vapor, and oxygen is fed to a reactor, wherein one part of the natural/associated gas is oxidized with the oxygen, and the other reacts with water vapor to form hydrogen and carbon oxides. The oxidation of the natural/associated gas provides a high temperature necessary for steam conversion of natural/associated gas. In essence, the process is a combination of partial oxidation and steam conversion. Reactions that run in an autothermal reforming process by the example of methane can be presented by the following equations:

$$CH_4 + 0.5O_2 \rightarrow CO + 2H_2, \Delta H700° = -23.0 \text{ kJ/mol}$$

$$CH_4 + 1.5O_2 \rightarrow CO + 2H_2O, \Delta H700° = -519.1 \text{ kJ/mol}$$

$$CH_4 + 2O_2 \rightarrow CO_2 + 2H_2O, \Delta H700° = -802.0 \text{ kJ/mol}$$

$$CH_4 + CO_2 \rightarrow 2CO + 2H_2, \Delta H700° = +260.2 \text{ kJ/mol}$$

$$CH_4 + H_2O \rightarrow CO + 3H_2, \Delta H700° = +206.1 \text{ kJ/mol}.$$

The process of autothermal reforming of natural/associated gas is flexible enough and can run in wide ranges of temperature (from 500 to 1000° C.), pressure (from 0.1 to 2 MPa), feedstock composition and vapor/carbon ratio. Advantages of the autothermal reforming of natural/associated gas are a high conversion of hydrocarbon gas, the possibility of obtaining synthesis gas with a wide range of the $H_2/CO$ ratio by adjusting relative concentrations of gaseous hydrocarbons, $H_2O$ ($CO_2$), and $O_2$ in feedstock, reaction temperature and pressure in the system. The presence of oxygen in feedstock helps to minimize deactivation of a catalyst with carbonaceous deposits.

As catalysts of autothermal reforming of light hydrocarbons to prepare a mixture of CO and $H_2$ (synthesis gas), metals of Group VIII of the Periodic System are used; nickel in an amount of 5 to 25 wt. % deposited on porous substrates, which usually are refractory oxides, are used more often. Reactions of oxidation of hydrocarbons with free oxygen in an autothermal reforming reaction have a high exothermal effect, which can lead to the local overheating of a catalyst, its sintering, and a reduction in its activity. The introduction of promoting additives allows to increases the resistance of catalysts to carbonization and prevents sintering of an active component. However, the use of more than 0.5 wt. % of a precious metal as a promoter can make the catalyst more expensive.

The activity, productivity, and selectivity of nickel catalysts for autothermal reforming of natural/associated gas, and their working stability depend on the particle size of nickel metal, the phase composition of the catalyst, the nature and structural characteristics of a support, and the presence of promoting additives.

Effective catalysts for autothermal reforming of natural/associated gas must have a high density of active centers providing a large specific reaction velocity. The creation of such catalysts requires a surface area of nickel metal of 8 to 11 $m^2/g$ at its dispersion on the support surface of at least 10%. The dispersion of the active component also depends on the surface area of the support that must be at least 20 $m^2/g$. The non-uniformity of the distribution of nickel throughout the catalyst volume and a large average size of nickel particles (dNi of more than 8 nm) leads to a reduction in the activity of the catalyst and its rapid deactivation due to intense carbonization. The support of the reforming catalyst must have a high thermal stability and must provide a high mechanical strength of the catalyst during its operation.

The process of autothermal reforming of natural/associated gas is used in association with a unit for producing synthetic hydrocarbons by a Fischer-Tropsch method in a compact version. The operation of the Fischer-Tropsch synthesis unit in a compact version at a feedstock space velocity of at least 20000 $h^{-1}$ requires the use of a high-performance autothermal reforming catalyst that provides the production of synthesis gas with an output of at least 7000 $m^3/m^3_{cat}·h$ and a conversion of natural/associated gas of at least 90%. The problem of preparing a catalyst for autothermal reforming of hydrocarbons, which will provide the production of synthesis gas with a output of at least 7000 $m^3/m^3_{cat}·h$ at a conversion of natural/associated gas of at least 90%, is solved by combining active components, the composition of a support, and a method for preparing an oxide composition in order to achieve a high dispersion of active particles in a thermostable oxide matrix. Methods for preparing catalysts, involving the use of solutions of active components (impregnation method) ensure the obtainment of active component clusters having a size of from several nanometers to 150 nm and larger. The evaporation of a solvent under drying a support generally provides a non-uniform particle distribution of the active component throughout the support volume and, as a consequence, the formation of relatively large particles of the active components.

The uniformity of the distribution of catalyst active particles on a support is achieved by various methods. For example, the method for preparing a catalyst according to U.S. Pat. No. 6,103,660, publ.15 Aug. 2000, provides a homogeneous precipitation of particles of the precursor of an active agent on particles of a support. A solution of the active component precursor is introduced in a suspension of the support particles by capillary injection under constant agitation. $\gamma$-$Al_2O_3$ or a mixture of lanthanum-stabilized $\gamma$-$Al_2O_3$ and a mixed Ce/Zr oxide are used as a support on which acetates of Ce, Zr, and Ba are precipitated.

A disadvantage of this catalyst is a large particle size of the active component that of from 100 to 3000 nm, which reduces the active component dispersion.

A catalyst for producing synthesis gas by reforming of light hydrocarbons is known, the catalyst comprising, in wt. %: nickel oxide (3.7 to 16.0), lanthanum oxide (0.1 to 4.1), zirconium dioxide (0.1 to 2.2), and an aluminum-magnesium support (the rest). The resulting catalyst is characterized by a high conversion in the methane reforming reaction at a temperature of 750° C. (RU 2185239 C1, publ. 20 Jul. 2002).

A disadvantage of the catalyst is a low specific surface of the support (0.10 to 0.15 m²/g), which aggravates the active component dispersion and may prevent the catalyst stable operation.

The catalyst according to U.S. Pat. No. 5,130,114, publ. 14 Jul. 1992, for reforming of light hydrocarbons comprises a zirconium oxide support, a main active component, which is Rh and/or Ru, and a co-catalyst from at least one element of the group of: Ni, Cr, Mg, Ca, Y, and other rare-earth elements. High activity of the catalyst and its slow carbonization are associated with properties of zirconium oxide as a support. In addition, according to the description, zirconium oxide can be used in a mixture or composition with other supports, such as $SiO_2$, $Al_2O_3$, and zeolite. The support can be partially stabilized with oxides, such as $CeO_2$, MgO, $Y_2O_3$, and prepared in the form of a mixture of zirconium oxides and stabilizing elements by any known method. Precipitated hydroxide particles of compositions of the support and co-catalyst have a size of 0.03 μm. The precipitate is dried and calcined, and active components, which are platinum group metals, are applied from their solutions or colloidal dispersions on the fired catalyst by impregnation, and then the catalyst is calcined at a temperature of 500-850° C. in air or nitrogen stream and subjected to a reduction treatment before reforming.

A disadvantage of the catalyst is a low methane conversion (less than 85%) and a decrease in the surface area of the catalyst during tests from 70 to 45 m²/g, which is probably caused by sintering and coking of the catalyst, which inevitably lead to a reduction in the productivity of the catalyst in producing synthesis gas during its operation.

Patent application US 20120258857, 11 Oct. 2012, describes a method for preparing an autothermal reforming catalyst, which is 40-300 nm particles of mixed oxides of magnesium, nickel, and aluminum, the method comprising synthesizing precursors of layered hydroxides of Mg, Ni, and Al by a sol-gel method from solutions of salts of the corresponding metals; promoting with platinum or rhodium (0.5-2.5 wt. %), followed by drying; partially decomposing at a temperature of 500-600° C.; and reducing in $H_2$—$N_2$ medium at a temperature of 450-700° C. to obtain nanosized particles. The catalyst is characterized by a low rate of carbonization.

Disadvantages of the catalyst are a high content of the promoter, which is Pt or Rh (from 0.5 to 2.5 wt. %), which significantly increases the cost of the catalyst, and a relatively large size of nickel oxide in mixed oxides, which can cause a reduction in the methane conversion and productivity.

A catalyst is known for the production of synthesis gas from gaseous hydrocarbons, water, carbon dioxide, and air oxygen, the catalyst comprising a mixed oxide of the composition: aM-bCo-cNi-dMg-eCa-fO, wherein cobalt (Co), nickel (Ni), and metal (M) are dispersed in the mixed oxide. The catalyst is prepared by impregnation. Indices a, b, c, d, e, and f are molar ratios, wherein a+b+c+d+e=1, $0.0001 \leq a \leq 0.20$, $0 < b \leq 0.20$, $0 < c \leq 0.20$, $0.001 < (b+c) \leq 0.20$, $0.60 \leq (d+e) \leq 0.9989$, $0 < d < 0.9989$, $0 < e < 0.9989$, f is the number necessary for an element to maintain charge equilibrium with oxygen, and metal (M) is at least one element from Groups IIIB and VIA of elements in the periodic table. RU 2475302 C2, 20 Feb. 2013.

A disadvantage of the catalyst is a low methane conversion (not more than 63%) and a reduction in the catalytic activity due to carbonization of the catalyst already after 20-hour operation.

Patent application RU 2012144371 A1, 27 Apr. 2014, discloses a crusted catalyst for autothermal reforming of hydrocarbon gases, the catalyst consisting of an active compound in the form of nickel alloy and one metal from iridium, rhodium, and ruthenium, on a support comprising alumina, zirconia, magnesia, titania, or combinations thereof. The active compound is particles of nickel and iridium, or nickel and rhodium, or nickel and ruthenium, wherein the content of iridium, or rhodium, or ruthenium in the catalyst ranges from 0.01 to 0.5 wt. %, and the content of nickel in the catalyst ranges from 2 to 16 wt. %. The support comprises alumina that is selected from α-alumina, calcium aluminate, magnesium-aluminum spinel, and combinations thereof.

A disadvantage of the proposed catalyst is that the active compound of the catalyst, which is in the form of nickel alloy and one of metal from iridium, rhodium and ruthenium, has a low dispersion and a relatively large average size of crystallites (about 100 nm), which can lead to a reduction in the methane conversion and the productivity of the catalyst in producing synthesis gas due to carbonization.

Patent RU 2532924 C1, 20 Nov. 2014, describes a catalyst of oxidation conversion of hydrocarbon gases in autothermal reforming of light hydrocarbons method to obtain carbon monoxide and hydrogen, the catalyst comprising platinum group metals and an oxide composition, wherein the platinum group metals include Pt, Pd, and Rh (0.5-2.0 wt. %), and wherein the oxide composition is prepared from a mixture of a sol of Al, Si, and Zr hydroxides with particles of oxides of Ni, Mg, and/or Ce with a size of 5 to 30 nm prepared by spray-pyrolysis from solutions of Ni, Mg and/or Ce salts. The catalyst prepared by this method has a high methane conversion in the process of autothermal reforming (90%) and selectivity for CO (about 90%).

Disadvantages of this catalyst are a large average particle size of nickel metal after reduction (more than 8 nm), thus prepared, which can lead to the formation of carbonaceous deposits on nickel and a reduction in the productivity of the catalyst in producing synthesis gas production in tests, a high content of promoters (from 0.5 to 2.0 wt. %), which significantly increases its cost, and the complexity of the catalyst preparation by spray-pyrolysis that requires special equipment.

The closest prior art to the claimed invention is patent application US 20110114892, 19 May 2011, disclosing a catalyst composition consisting of Ni/Ce/MgAlO$_x$ or Ni/Ce—Zr/MgAlO$_x$ for preparing synthesis gas. An MgAlO$_x$ support has a specific surface area of 150 to 300 m²/g, and an MgO/$Al_2O_3$ molar ratio of 0.2 to 0.8. The MgAlO$_x$ support is treated with a Ce-containing component that has oxygen-ion conductivity, or a Ce—Zr-containing component capable of inhibiting carbon deposition through the simultaneous introduction of acid sites and base sites. The prepared Ni/Ce(Zr)/MgAlO$_x$ catalyst has a specific surface area of 20-120 m²/g, a pore volume of 0.20-0.34 ml/g, an average pore size of 11.0 to 16.5 nm, a particle size of NiO (before reforming) of 11.3 to 14.7 nm, and a Ni particle size (after reforming) of 16.4 to 28.6 nm.

Disadvantages of this catalyst are a low conversion of hydrocarbon gas (73 to 86%), a low synthesis gas output (about 5640 m³/(m³$_{cat}$·h)), and an increase in the active component particle size after catalytic tests, which leads to a reduction in the methane conversion on the catalyst, its productivity in producing synthesis gas in tests, and can cause an increased coking selectivity.

The technical problem is the development of a catalyst for conversion of natural/associated gas into synthesis gas in autothermal reforming and a method for preparing the catalyst providing a stable operation at high performance operation mode.

SUMMARY OF THE INVENTION

The technical result provided by the claimed group of inventions is the development of an autothermal reforming catalyst ensuring the production of synthesis gas with a high average conversion rate of natural/associated gas of at least 90% and a synthesis gas output of at least 7000 m$^3$/(m$^3_{cat}$·h).

The Best Embodiment of the Invention

The technical result provided by the claimed group of inventions is achieved by the fact that the catalyst in a calcined state has a specific surface area of 20 to 50 m$^2$/g of catalyst and a specific surface area of nickel metal after the catalyst reduction of 8 to 11 m$^2$/g, an average particles of nickel metal of 3 to 8 nm, and a particle dispersion of 10 to 16%; comprises from 5 to 15 wt. % of nickel based on the weight of the calcined catalyst and a support having a specific surface area of 40 to 120 m$^2$/g and a support pore volume of 0.2 to 0.4 cm$^3$/g, wherein the support is selected from a mixture of zirconia and ceria or magnesia, ceria, and the balance being zirconia. The catalyst further comprises a promoter selected from the group of palladium and ruthenium, in an amount of 0.01 to 0.5 wt. %; and is prepared by co-precipitation with ammonium hydroxide from a solution comprising nickel, cerium, and zirconium precursors and distilled water or from a solution containing nickel, cerium, zirconium, and magnesium precursors and distilled water and having a pH of 8.0-9.0, under agitation at a temperature of 40-45° C. for 1-2 hours, followed by filtration, drying at a temperature of 100-110° C. for 6-8 hours, and calcining at a temperature of 400-650° C. for 4-6 hours.

These distinguishing features are essential.

The preparation of a catalyst according to the described method provides a catalyst system, the presence of which allows the production of synthesis gas from hydrocarbons of natural/associated gas, water and oxygen at a hydrocarbon mixture conversion of at least 90% with a synthesis gas output of at least 7000 m$^3$/m$^3_{cat}$·h.

The catalyst according to the invention is prepared by co-precipitation of a solution comprising cerium, zirconium, magnesium, and nickel precursors with an aqueous solution of ammonium hydroxide. First, precursors of the main support components, which are zirconium oxonitrate, magnesium nitrate, cerium nitrate or a mixture thereof, as well as the precursor of an active component, which is nickel nitrate, are dissolved in distilled water at a temperature of 40-45° C. for 1-2 hours. Then, a 25 wt. % solution of ammonium hydroxide is added by drops to the resulting solution under constant thorough agitation until reaching a pH of the solution of 8.0 to 9.0. The co-precipitation results in the formation of a homogeneous mixture of magnesium, cerium, and zirconium, as well as Ni(NH$_3$)$_6$(OH)$_2$ ammonium complex. The resulting mixture is filtered through a Buchner funnel, dried at a temperature of 100-110° C. for 6-8 hours and then calcined at a temperature of 400-650° C. for 4-6 hours.

At the second step, a promoter selected from the group of Pd or Ru can be introduced into the resulting catalyst in an amount of 0.01 to 0.5 wt. %. The introduction of promoters can be made by impregnation after the deposition of the active agent at a room temperature for 1 to 2 hours, followed by drying at 110° C. for 6-8 hours and calcining at 400-650° C. for 4-6 hours.

The catalyst prepared by the above described methods has a content of nickel in a calcined catalyst of 5-15 wt. %, a specific surface area of the catalyst of 20-60 m$^2$/g, a specific surface area of nickel metal after the catalyst reduction of 8-11 m$^2$/g, an average particle size of nickel metal of 3-8 nm, and a particle dispersion of 10 to 16%.

The process of activation is performed at a hydrogen space velocity of 3000 h$^{-1}$, a temperature of 750° C., and atmospheric pressure for 1 hour. After the catalyst activation, the hydrogen stream is replaced with the stream of natural/associated gas, oxygen and steam at a space velocity of 3000 h$^{-1}$; the reactor is brought up to an operating pressure of 0.5 MPa and a temperature of 850° C.; and autothermal reforming of methane is performed in the mixture for 100 hours. The C:H$_2$O:O$_2$ molar ratio is 1:1:0.4. Natural or associated gas is used as a feedstock.

The catalyst operating efficiency is evaluated based on the average conversion of natural/associated gas and the synthesis gas output for a specified period of the operation.

The conversion of C$_1$-C$_4$ hydrocarbons in an autothermal reforming process is calculated according to the following equation (9):

$$K_{C_1-C_4} = \frac{m^{in}_{CH_4} + m^{in}_{C_2} + m^{in}_{C_3} + m^{in}_{C_4} - m^{out}_{CH_4} - m^{out}_{C_2} - m^{out}_{C_3} - m^{out}_{C_4}}{m^{in}_{CH_4} + m^{in}_{C_2} + m^{in}_{C_3} + m^{in}_{C_4}} \cdot 100\%, \quad (9)$$

m$^{in}$ is the weight of methane (or C$_1$-C$_4$ hydrocarbons) entering the reactor for time τ;

m$^{out}$ is the weight of methane (or C$_1$-C$_4$ hydrocarbons) escaping from the reactor for time τ.

The productivity of the catalyst in producing synthesis gas is calculated according to the following equation:

$$P_{H_2+CO} = \frac{V_{H_2} + V_{CO}}{V_{cat}} \cdot 1000 \left[ \frac{m^3}{m^3_{cat} \cdot h} \right],$$

V$_{H_2}$ is the volume of hydrogen resulting from the conversion, m$^3$/h;

V$_{CO}$ is the volume of carbon monoxide resulting from the conversion, m$^3$/h;

V$_{cat}$ is the catalyst volume loaded to the reactor, m$^3$.

The content of the initial and resulting substances in the gases escaping from the natural/associated gas conversion reactor can be determined by any known method, for example, by gas chromatography.

The active component area, its dispersion and the average nickel particle size in the reduced state of a freshly prepared catalyst and in the catalyst after catalytic tests can be determined by any known method, for example, using the method of oxygen titration on an AutoChem II 2920 chemisorption analyzer (Micromeritics, USA). The dispersion and surface area of nickel metal are calculated based on the data of the oxygen adsorption. The catalysts stability to the agglomeration of the active component is evaluated based on the ratio of the average nickel particle size before and after catalytic tests by the oxygen titration method.

The catalyst specific surface can be determined by any method known in the art, for example, using the method of nitrogen porosimetry on an ASAP 2020 surface area and porosity analyzer (Micromeritics, USA).

EMBODIMENTS OF THE INVENTION

The method can be implemented according to the following examples.

Example A is a comparative example and illustrates the embodiment of the method in accordance with the prototype.

Examples 1-16 show embodiments of the method according to the present invention.

Example A

A Ni/Ce-Zr/MgAlO$_x$ catalyst is prepared by co-impregnation of MgAlO$_x$ (30) (Pural MG30) with aqueous solutions of cerium acetate, zirconium oxonitrate, and nickel nitrate. The resulting composition of the oxide catalyst is dried for 12 hours at a temperature of 70° C. and at a temperature of 100° C. for 24 hours, after which the catalyst is calcined at a temperature of 850° C. for 6 hours. The resulting catalyst is pressed in a special mold and ground to obtain a catalyst fraction of 0.5-1.0 mm. The catalyst is activated at a temperature of 750° C. in a hydrogen stream with a space velocity of 3000 h$^{-1}$ for one hour under a pressure of 0.1 MPa.

Example 1

A 10% Ni/(25% CeO$_2$+75% ZrO$_2$) catalyst is prepared by co-precipitation of a solution comprising cerium, zirconium, and nickel precursors with ammonium hydroxide to form the corresponding hydroxides, followed by filtration, drying, and calcining. First, a sample of zirconium oxonitrate and cerium nitrate in CeO$_2$/ZrO$_2$ weight ratio of 1:4 and a sample of nickel nitrate in a nickel mass fraction of 10 wt. % are dissolved in distilled water at 40° C. for 1 hour. Then, a 25 wt. % solution of ammonium hydroxide is added by drops to the resulting solution under constant thorough agitation until reaching a pH of the solution of 8.0. The resulting mixture is filtered through a Buchner funnel, dried at a temperature of 110° C. for 6 hours and then calcined at a temperature of 400° C. for 6 hours to obtain solid solutions of cerium, zirconium, and nickel oxides uniformly distributed throughout the volume of the catalyst grains. The resulting catalyst is pressed in a special mold and then ground to obtain a catalyst fraction of 0.5-1.0 mm. The process of the catalyst activation is conducted at 750° C. in a hydrogen stream with a space velocity of 3000 h$^{-1}$ for one hour under a pressure of 0.1 MPa. Gas containing 100% CH$_4$ is used as a feedstock.

Example 2

A 15% Ni/(25% CeO$_2$+75% ZrO$_2$) catalyst is prepared by co-precipitation of a solution comprising cerium, zirconium, and nickel precursors with ammonium hydroxide to form the corresponding hydroxides, followed by filtration with washing with distilled water, drying, and calcining. First, a sample of zirconium oxonitrate and cerium nitrate in a CeO$_2$/ZrO$_2$ weight ratio of 1:4 and a sample of nickel nitrate in a nickel mass fraction of 10 wt. % are dissolved in distilled water at 45° C. for 2 hours. Then, a 25 wt. % solution of ammonium hydroxide is added by drops to the resulting solution under constant thorough agitation until reaching a pH of the solution of 9.0. The resulting mixture is filtered through a Buchner funnel, dried at a temperature of 100° C. for 8 hours and then calcined at a temperature of 650° C. for 4 hours to obtain solid solutions of cerium, zirconium, and nickel oxides uniformly distributed throughout the volume of the catalyst grains. The resulting catalyst is pressed in a special mold and then ground to obtain a catalyst fraction of 0.5-1.0 mm. The process of the catalyst activation is conducted at a temperature of 750° C. in a hydrogen stream with a space velocity of 3000 h$^{-1}$ for one hour under a pressure of 0.1 MPa. Gas containing 100% CH$_4$ is used as a feedstock.

Example 3

A 5% Ni/(17% CeO$_2$+83% ZrO$_2$) catalyst is prepared by co-precipitation of a solution comprising cerium, zirconium, and nickel precursors with ammonium hydroxide to form the corresponding hydroxides, followed by filtration, drying, and calcining. First, a sample of zirconium oxonitrate and cerium nitrate in a CeO$_2$/ZrO$_2$ weight ratio of 1:6, and a sample of nickel nitrate in a nickel mass fraction of 5 wt. % are dissolved in distilled water at 40° C. for 1 hour. Then, a 25 wt. % solution of ammonium hydroxide is added by drops to the resulting solution under constant thorough agitation until reaching a pH of the solution of 8.0. The resulting mixture is filtered through a Buchner funnel, dried at a temperature of 110° C. for 6 hours and then calcined at a temperature of 400° C. for 6 hours to obtain solid solutions of cerium, zirconium, and nickel oxides uniformly distributed throughout the volume of the catalyst grains. The resulting catalyst is pressed in a special mold and then ground to obtain a catalyst fraction of 0.5-1.0 mm. The process of the catalyst activation is conducted at a temperature of 50° C. in a hydrogen stream with a space velocity of 3000 h$^{-1}$ for one hour under a pressure of 0.1 MPa. Gas containing 100% CH$_4$ is used as a feedstock.

Example 4

A 15% Ni/(34% CeO$_2$+66% ZrO$_2$) catalyst is prepared by co-precipitation of a solution comprising cerium, zirconium, and nickel precursors with ammonium hydroxide to form the corresponding hydroxides, followed by filtration, drying, and calcining. First, a sample of zirconium oxonitrate and cerium nitrate in a CeO$_2$/ZrO$_2$ weight ratio of 1:2, and a sample of nickel nitrate in a nickel mass fraction of 15 wt. % are dissolved in distilled water at 45° C. for 2 hours. Then, a 25 wt. % solution of ammonium hydroxide is added by drops to the resulting solution under constant thorough agitation until reaching a pH of the solution of 9.0. The resulting mixture is filtered through a Buchner funnel, dried at a temperature of 110° C. for 8 hours and then calcined at a temperature of 650° C. for 4 hours to obtain solid solutions of cerium, zirconium, and nickel oxides uniformly distributed throughout the volume of the catalyst grains. The resulting catalyst is pressed in a special mold and then ground to obtain a catalyst fraction of 0.5-1.0 mm. The process of the catalyst activation is conducted at a temperature of 750° C. in a hydrogen stream with a space velocity of 3000 h$^{-1}$ for one hour under a pressure of 0.1 MPa. Gas containing 100% CH$_4$ is used as a feedstock.

Example 5

A 10% Ni/(23% CeO$_2$+70% ZrO$_2$+7% MgO) catalyst is prepared by co-precipitation of a solution comprising cerium, zirconium, magnesium, and nickel precursors with ammonium hydroxide to form the corresponding hydroxides, followed by filtration, drying, and calcining. First, a sample of zirconium oxonitrate and cerium nitrate in a $CeO_2/ZrO_2$ weight ratio of 1:4 and a sample of magnesium nitrate in a $MgO/ZrO_2$ weight ratio of 1:10, as well as a sample of nickel nitrate in a nickel mass fraction of 10 wt. %, are dissolved in distilled water at 40° C. for 1 hour. Then, a 25 wt. % solution of ammonium hydroxide is added by drops to the resulting solution under constant thorough agitation until reaching a pH of the solution of 8.0. The resulting mixture is filtered through a Buchner funnel, dried at a temperature of 110° C. for 6 hours and then calcined at a temperature of 400° C. for 6 hours to obtain solid solutions of cerium, zirconium, magnesium, and nickel oxides uniformly distributed throughout the volume of the catalyst grains. The resulting catalyst is pressed in a special mold and then ground to obtain a catalyst fraction of 0.5-1.0 mm. The process of the catalyst activation is conducted at a temperature of 750° C. in a hydrogen stream with a space velocity of 3000 $h^{-1}$ for one hour under a pressure of 0.1 MPa. Gas containing 100% $CH_4$ is used as a feedstock.

Example 6

A 5% Ni/(22% $CeO_2$+65% $ZrO_2$+13% MgO) catalyst is prepared by co-precipitation of a solution comprising cerium, zirconium, magnesium, and nickel precursors with ammonium hydroxide to form the corresponding hydroxides, followed by filtration, drying, and calcining. First, a sample of zirconium oxonitrate and cerium nitrate in a $CeO_2/ZrO_2$ weight ratio of 1:4 and a sample of magnesium nitrate in a $MgO/ZrO_2$ weight ratio of 1:5, as well as a sample of nickel nitrate in a nickel mass fraction of 5 wt. %, are dissolved in distilled water at 45° C. for 2 hours. Then, a 25 wt. % solution of ammonium hydroxide is added by drops to the resulting solution under constant thorough agitation until reaching a pH of the solution of 8.5. The resulting mixture is filtered through a Buchner funnel, dried at a temperature of 110° C. for 7 hours and then calcined at a temperature of 550° C. for 5 hours to obtain solid solutions of cerium, zirconium, magnesium, and nickel oxides uniformly distributed throughout the volume of the catalyst grains. The resulting catalyst is pressed in a special mold and then ground to obtain a catalyst fraction of 0.5-1.0 mm. The process of the catalyst activation is conducted at a temperature of 750° C. in a hydrogen stream with a space velocity of 3000 $h^{-1}$ for one hour under a pressure of 0.1 MPa. Gas containing 100% $CH_4$ is used as a feedstock.

Example 7

A 15% Ni/(24% $CeO_2$+71% $ZrO_2$+5% MgO) catalyst is prepared by co-precipitation of a solution comprising cerium, zirconium, magnesium, and nickel precursors with ammonium hydroxide to form the corresponding hydroxides, followed by filtration without washing with distilled water, drying, and calcining. First, a sample of zirconium oxonitrate and cerium nitrate in a $CeO_2/ZrO_2$ weight ratio of 1:4 and a sample of magnesium nitrate in a $MgO/ZrO_2$ weight ratio of 1:15, as well as a sample of nickel nitrate in a nickel mass fraction of 15 wt. % are dissolved in distilled water at 45° C. for 2 hours. Then, a 25 wt. % solution of ammonium hydroxide is added by drops to the resulting solution under constant thorough agitation until reaching a pH of the solution of 9.0. The resulting mixture is filtered through a Buchner funnel, dried at a temperature of 110° C. for 8 hours and then calcined at a temperature of 650° C. for 4 hours to obtain solid solutions of cerium, zirconium, magnesium, and nickel oxides uniformly distributed throughout the volume of the catalyst grains. The resulting catalyst is pressed in a special mold and then ground to obtain a catalyst fraction of 0.5-1.0 mm. The process of the catalyst activation is conducted at a temperature of 750° C. in a hydrogen stream with a space velocity of 3000 $h^{-1}$ for one hour under a pressure of 0.1 MPa. Gas containing 100% $CH_4$ is used as a feedstock.

Example 8

A (5% Ni+0.01% Pd)/(25% $CeO_2$+75% $ZrO_2$) catalyst is prepared by co-precipitation of a solution comprising cerium, zirconium, and nickel precursors with ammonium hydroxide to form the corresponding hydroxides, followed by filtration without washing with distilled water, drying, and calcining, and further introducing palladium by impregnation. First, a sample of zirconium oxonitrate and cerium nitrate in a $CeO_2/ZrO_2$ weight ratio of 1:4 and a sample of nickel nitrate in a nickel mass fraction of 5 wt. % are dissolved in distilled water at 40° C. for 1 hour. Then, a 25 wt. % solution of ammonium hydroxide is added by drops to the resulting solution under constant thorough agitation until reaching a pH of the solution of 8.0. The resulting mixture is filtered through a Buchner funnel, dried at a temperature of 110° C. for 6 hours and then calcined at a temperature of 400° C. for 6 hours to obtain solid solutions of cerium, zirconium, and nickel oxides uniformly distributed throughout the volume of the catalyst grains. At the second step of the catalyst preparation, a nickel, cerium-zirconium powder composition is impregnated with a solution of tetraaminepalladium chloride based on 0.01 wt. % Pd at room temperature for 1 hour. After the termination of the impregnation process, the catalyst is dried for 6 hours at a temperature of 110° C. and then calcined in air at a temperature of 550° C. for 4 hours. The resulting catalyst is pressed in a special mold and then ground to obtain a catalyst fraction of 0.5-1.0 mm. The process of the catalyst activation is conducted at a temperature of 750° C. in a hydrogen stream with a space velocity of 3000 $h^{-1}$ for one hour under a pressure of 0.1 MPa. Gas containing 100% $CH_4$ is used as a feedstock.

Example 9

A (10% Ni+0.1% Pd)/(25% $CeO_2$+75% $ZrO_2$) catalyst is prepared by co-precipitation of a solution comprising cerium, zirconium, and nickel precursors with ammonium hydroxide to form the corresponding hydroxides, followed by filtration without washing with distilled water, drying, and calcining and further introducing palladium by impregnation. First, a sample of zirconium oxonitrate and cerium nitrate in a $CeO_2/ZrO_2$ weight ratio of 1:4, and a sample of nickel nitrate in a nickel mass fraction of 10 wt. % are dissolved in distilled water at 45° C. for 2 hours. Then, a 25 wt. % solution of ammonium hydroxide is added by drops to the resulting solution under constant thorough agitation until reaching a pH of the solution of 8.5. The resulting mixture is filtered through a Buchner funnel, dried at a temperature of 110° C. for 7 hours and then calcined at a temperature of 550° C. for 5 hours to obtain solid solutions of cerium, zirconium, and nickel oxides uniformly distributed throughout the volume of the catalyst grains. At the second step of the catalyst preparation, a nickel, cerium-zirconium powder composition is impregnated with a solution of tetraaminepalladium chloride based on 0.1 wt. % Pd at room temperature for 1 hour. After the termination of the impregnation process, the catalyst is dried at a temperature of 110° C. for 6 hours and then calcined in air at a temperature of 550° C. for 4 hours. The resulting catalyst is pressed in a special mold and then ground to obtain a catalyst fraction of 0.5-1 mm. The process of the catalyst activation is conducted at a temperature of 750° C. in a hydrogen stream with a space velocity of 3000 h$^{-1}$ for one hour under a pressure of 0.1 MPa. Gas containing 100% $CH_4$ is used as a feedstock.

Example 10

A (15% Ni+0.5% Pd)/(25% $CeO_2$+75% $ZrO_2$) catalyst is prepared by co-precipitation of a solution comprising cerium, zirconium, and nickel precoursors with ammonium hydroxide to form the corresponding hydroxides, followed by filtration without washing with distilled water, drying, and calcining and further introducing palladium by impregnation. First, a sample of zirconium oxonitrate and cerium nitrate in a $CeO_2/ZrO_2$ weight ratio of 1:4, and a sample of nickel nitrate in a nickel mass fraction of 15 wt. % are dissolved in distilled water at 45° C. for 2 hours. Then, a 25 wt. % solution of ammonium hydroxide is added by drops to the resulting solution under constant thorough agitation until reaching a pH of the solution of 9.0. The resulting mixture is filtered through a Buchner funnel, dried at a temperature of 110° C. for 8 hours and then calcined at a temperature of 650° C. for 4 hours to obtain solid solutions of cerium, zirconium, and nickel oxides uniformly distributed throughout the volume of the catalyst grains. At the second step of the catalyst preparation, a nickel, cerium-zirconium powder composition is impregnated with a solution of tetraaminepalladium chloride based on 0.5 wt. % Pd at room temperature for 1 hour. After the termination of the impregnation process, the catalyst is dried at a temperature of 110° C. for 6 hours and then calcined in air at a temperature of 550° C. for 4 hours. The resulting catalyst is pressed in a special mold and then ground to obtain a catalyst fraction of 0.5-1.0 mm. The process of the catalyst activation is conducted at a temperature of 750° C. in a hydrogen stream with a space velocity of 3000 h$^{-1}$ for one hour under a pressure of 0.1 MPa. Gas containing 100% $CH_4$ is used as a feedstock.

Example 11

A (5% Ni+0.01% Ru)/(25% $CeO_2$+75% $ZrO_2$) catalyst is prepared by co-precipitation of a solution comprising cerium, zirconium, and nickel precoursors with ammonium hydroxide to form the corresponding hydroxides, followed by filtration, drying, and calcining and further introducing ruthenium by impregnation. First, a sample of zirconium oxonitrate and cerium nitrate in a $CeO_2/ZrO_2$ weight ratio of 1:4, and a sample of nickel nitrate in a nickel mass fraction of 5 wt. % are dissolved in distilled water at 40° C. for 1 hours. Then, a 25 wt. % solution of ammonium hydroxide is added by drops to the resulting solution under constant thorough agitation until reaching a pH of the solution of 8.0. The resulting mixture is filtered through a Buchner funnel, dried at a temperature of 110° C. for 6 hours and then calcined at a temperature of 400° C. for 6 hours to obtain solid solutions of cerium, zirconium, and nickel oxides uniformly distributed throughout the volume of the catalyst grains. At the second step of the catalyst preparation, a nickel, cerium-zirconium powder composition is impregnated with a solution of ruthenium chloride based on 0.01 wt. % Ru at room temperature for 1.5 hour. After the termination of the impregnation process, the catalyst is dried at a temperature of 110° C. for 7 hours and then calcined in air at a temperature of 400° C. for 5 hours. The resulting catalyst is pressed in a special mold and then ground to obtain a catalyst fraction of 0.5-1.0 mm. The process of the catalyst activation is conducted at a temperature of 750° C. in a hydrogen stream with a space velocity of 3000 h$^{-1}$ for one hour under a pressure of 0.1 MPa. Gas containing 100% $CH_4$ is used as a feedstock.

Example 12

A (10% Ni+0.1% Ru)/(25% $CeO_2$+75% $ZrO_2$) catalyst is prepared by co-precipitation of a solution comprising cerium, zirconium, and nickel precoursors with ammonium hydroxide to form the corresponding hydroxides, followed by filtration without washing with distilled water, drying, and calcining and further introducing ruthenium by impregnation. First, a sample of zirconium oxonitrate and cerium nitrate in a $CeO_2/ZrO_2$ weight ratio of 1:4, and a sample of nickel nitrate in a nickel mass fraction of 10 wt. % are dissolved in distilled water at 45° C. for 2 hours. Then, a 25 wt. % solution of ammonium hydroxide is added by drops to the resulting solution under constant thorough agitation until reaching a pH of the solution of 8.5. The resulting mixture is filtered through a Buchner funnel without washing with distilled water, dried at a temperature of 110° C. for 7 hours and then calcined at a temperature of 550° C. for 5 hours to obtain solid solutions of cerium, zirconium, and nickel oxides uniformly distributed throughout the volume of the catalyst grains. At the second step of the catalyst preparation, a nickel, cerium-zirconium powder composition is impregnated with a solution of ruthenium chloride based on 0.1 wt. % Ru at room temperature for 1.5 hour. After the termination of the impregnation process, the catalyst is dried at a temperature of 110° C. for 7 hours and then calcined in air at a temperature of 400° C. for 5 hours. The resulting catalyst is pressed in a special mold and then ground to obtain a catalyst fraction of 0.5-1.0 mm. The process of the catalyst activation is conducted at a temperature of 750° C. in a hydrogen stream with a space velocity of 3000 h$^{-1}$ for one hour under a pressure of 0.1 MPa. Gas containing 100% $CH_4$ is used as a feedstock.

Example 13

A (15% Ni+0.5% Ru)/(25% $CeO_2$+75% $ZrO_2$) catalyst is prepared by co-precipitation of a solution comprising cerium, zirconium, and nickel precoursors with ammonium hydroxide to form the corresponding hydroxides, followed by filtration without washing with distilled water, drying, and calcining and further introducing ruthenium by impregnation. First, a sample of zirconium oxonitrate and cerium nitrate in a $CeO_2/ZrO_2$ weight ratio of 1:4, and a sample of nickel nitrate in a nickel mass fraction of 15 wt. % are dissolved in distilled water at 45° C. for 2 hours. Then, a 25 wt. % solution of ammonium hydroxide is added by drops to the resulting solution under constant thorough agitation until reaching a pH of the solution of 9.0. The resulting mixture is filtered through a Buchner funnel, dried at a temperature of 110° C. for 8 hours and then calcined at a temperature of 650° C. for 4 hours to obtain solid solutions of cerium, zirconium, and nickel oxides uniformly distributed throughout the volume of the catalyst grains. At the second step of the catalyst preparation, a nickel, cerium-zirconium powder composition is impregnated with a solution of ruthenium chloride based on 0.5 wt. % Ru at room temperature for 1.5 hour. After the termination of the impregnation process, the catalyst is dried at a temperature of 110° C. for 7 hours and then calcined in air at a temperature of 400° C. for 5 hours. The resulting catalyst is pressed in a special mold and then ground to obtain a catalyst fraction of 0.5-1.0 mm. The process of the catalyst activation is conducted at a temperature of 750° C. in a hydrogen stream with a space velocity of 3000 h$^{-1}$ for one hour under a pressure of 0.1 MPa. Gas containing 100% $CH_4$ is used as a feedstock.

Example 14

A (10% Ni+0.1% Pd)/(25% $CeO_2$+75% $ZrO_2$) catalyst is prepared by co-precipitation of a solution comprising cerium, zirconium, and nickel precoursors with ammonium hydroxide to form the corresponding hydroxides, followed by filtration without washing with distilled water, drying, and calcining and further introducing palladium by impregnation. First, a sample of zirconium oxonitrate and cerium nitrate in a $CeO_2/ZrO_2$ weight ratio of 1:4, and a sample of nickel nitrate in a nickel mass fraction of 10 wt. % are dissolved in distilled water at 45° C. for 2 hours. Then, a 25 wt. % solution of ammonium hydroxide is added by drops to the resulting solution under constant thorough agitation until reaching a pH of the solution of 8.5. The resulting mixture is filtered through a Buchner funnel, dried at a temperature of 110° C. for 7 hours and then calcined at a temperature of 550° C. for 5 hours to obtain solid solutions of cerium, zirconium, and nickel oxides uniformly distributed throughout the volume of the catalyst grains. At the second step of the catalyst preparation, a nickel, cerium-zirconium powder composition is impregnated with a solution of tetraaminepalladium chloride based on 0.1 wt. % Pd at room temperature for 1 hour. After the termination of the impregnation process, the catalyst is dried at a temperature of 110° C. for 6 hours and then calcined in air at a temperature of 550° C. for 4 hours. The resulting catalyst is pressed in a special mold and then ground to obtain a catalyst fraction of 0.5-1.0 mm. The process of the catalyst activation is conducted at a temperature of 750° C. in a hydrogen stream with a space velocity of 3000 h$^{-1}$ for one hour under a pressure of 0.1 MPa. Gas simulating the composition of associated petroleum gas, comprising 10% $C_2H_6$ and 90% $CH_4$ is used as a feed methane-containing mixture.

Example 15

A (10% Ni+0.1% Pd)/(25% $CeO_2$+75% $ZrO_2$) catalyst is prepared by co-precipitation a solution comprising cerium, zirconium, and nickel precoursors with ammonium hydroxide to form the corresponding hydroxides, followed by filtration without washing with distilled water, drying, and calcining, and further introducing palladium by impregnation. First, a sample of zirconium oxonitrate and cerium nitrate in a $CeO_2/ZrO_2$ weight ratio of 1:4 and a sample of nickel nitrate in a nickel mass fraction of 10 wt. % are dissolved in distilled water at 45° C. for 2 hours. Then, a 25 wt. % solution of ammonium hydroxide is added by drops to the resulting solution under constant thorough agitation until reaching a pH of the solution of 8.5. The resulting mixture is filtered through a Buchner funnel, dried at a temperature of 110° C. for 7 hours and then calcined at a temperature of 550° C. for 5 hours to obtain solid solutions of cerium, zirconium, and nickel oxides uniformly distributed throughout the volume of the catalyst grains. At the second step of the catalyst preparation, a nickel, cerium-zirconium powder composition is impregnated with a solution of tetraaminepalladium chloride based on 0.1 wt. % Pd at room temperature for 1 hour. After the termination of the impregnation process, the catalyst is dried at a temperature of 110° C. for 6 hours and then calcined in air at a temperature of 550° C. for 4 hours. The resulting catalyst is pressed in a special mold and then ground to obtain a catalyst fraction of 0.5-1.0 mm. The process of the catalyst activation is conducted at a temperature of 750° C. in a hydrogen stream with a space velocity of 3000 h$^{-1}$ for one hour under a pressure of 0.1 MPa. Gas simulating the composition of associated petroleum gas, comprising 25% $C_2H_6$, 5% $C_3H_8$ and 70% $CH_4$ is used as a feed methane-containing mixture.

Example 16

A (10% Ni+0.1% Pd)/(25% $CeO_2$+75% $ZrO_2$) catalyst is prepared by co-precipitation of a solution comprising cerium, zirconium, and nickel precoursors with ammonium hydroxide to form the corresponding hydroxides, followed by filtration without washing with distilled water, drying, and calcining, and further introducing palladium by impregnation. First, a sample of zirconium oxonitrate and cerium nitrate in a $CeO_2/ZrO_2$ weight ratio of 1:4 and a sample of nickel nitrate in a nickel mass fraction of 10 wt. % are dissolved in distilled water at 45° C. for 2 hours. Then, a 25 wt. % solution of ammonium hydroxide is added by drops to the resulting solution under constant thorough agitation until reaching a pH of the solution of 8.5. The resulting mixture is filtered through a Buchner funnel, dried at a temperature of 110° C. for 7 hours and then calcined at a temperature of 550° C. for 5 hours to obtain solid solutions of cerium, zirconium, and nickel oxides uniformly distributed throughout the volume of the catalyst grains. At the second step of the catalyst preparation, a nickel, cerium-zirconium powder composition is impregnated with a solution of tetraaminepalladium chloride based on 0.1 wt. % Pd at room temperature for 1 hour. After the termination of the impregnation process, the catalyst is dried at a temperature of 110° C. for 6 hours and then calcined in air at a temperature of 550° C. for 4 hours. The resulting catalyst is pressed in a special mold and then ground to obtain a catalyst fraction of 0.5-1.0 mm. The process of the catalyst activation is conducted at a temperature of 750° C. in a hydrogen stream with a space velocity of 3000 h$^{-1}$ for one hour under a pressure of 0.1 MPa. Gas simulating the composition of associated petroleum gas, comprising 15% $C_2H_6$, 10% $C_3H_8$, 5% $C_4H_{10}$, and 70% $CH_4$ is used as a feed methane-containing mixture.

The table shows the average conversion of a mixture that simulates the composition of natural or associated gas, in the presence of the catalysts prepared in accordance with the prototype (example A) and examples 1-16 of the present invention, and their average productivity in producing synthesis gas. The distribution of nickel, cerium, zirconium, and, in some examples, magnesium in the volume of particles of the catalysts synthesized by the co-precipitation according to examples 1-16 is uniform throughout the volume of the catalyst.

The table also shows the surface area of the supports and catalysts, as well as the values of the specific area of nickel, its dispersion, and average particle size.

| Examp. | NG/APG conversion, % | Synthesis gas output, $m^3/m^3_{cat} \cdot h$ | Support physicochemical properties $S_{area}$, $m^2/ml$ | $V_{pore}$, $cm^3/g$ | Catalyst physicochemical properties $S_{area}$, $m^2/ml$ | $S_{Ni}$, $m^2/ml$ | $D_{Ni}$, % | $d_{Ni}$, nm |
|---|---|---|---|---|---|---|---|---|
| A | 81 | 5610 | 40 | 0.2 | 20 | 5.8 | 7 | 14 |
| 1 | 93 | 7030 | 90 | 0.3 | 44 | 9.4 | 11 | 7 |
| 2 | 90 | 7000 | 40 | 0.2 | 20 | 10.8 | 10 | 8 |
| 3 | 91 | 7025 | 78 | 0.3 | 38 | 8.0 | 14 | 6 |
| 4 | 93 | 7100 | 71 | 0.2 | 33 | 10.4 | 12 | 7 |
| 5 | 93 | 7280 | 115 | 0.3 | 56 | 10.6 | 16 | 3 |
| 6 | 91 | 7060 | 94 | 0.3 | 50 | 8.4 | 11 | 8 |
| 7 | 93 | 7110 | 86 | 0.2 | 42 | 10.9 | 14 | 6 |
| 8 | 92 | 7050 | 92 | 0.3 | 46 | 8.2 | 16 | 4 |
| 9 | 94 | 7320 | 120 | 0.4 | 60 | 11.0 | 16 | 3 |
| 10 | 94 | 7120 | 84 | 0.2 | 40 | 10.7 | 13 | 6 |
| 11 | 92 | 7040 | 88 | 0.3 | 42 | 8.3 | 16 | 4 |
| 12 | 94 | 7180 | 102 | 0.4 | 54 | 10.5 | 16 | 4 |
| 13 | 93 | 7115 | 74 | 0.2 | 32 | 10.9 | 12 | 7 |
| 14 | 94 | 7345 | 120 | 0.4 | 60 | 11.0 | 16 | 3 |
| 15 | 95 | 7386 | 120 | 0.4 | 60 | 11.0 | 16 | 3 |
| 16 | 96 | 7495 | 120 | 0.4 | 60 | 11.0 | 16 | 3 |

The catalyst prepared in accordance with the comparative example has a low efficiency in autothermal reforming of natural/associated gas, which is characterized by a low hydrocarbon conversion and a low productivity of the catalyst. In addition, this catalyst has the smallest active surface area of nickel, a lower dispersion, and the largest average nickel particle size in reduced state at minimum values of the surface area of the support and catalyst. This is the reason of a low methane conversion and a low synthesis gas output. The catalysts synthesized according to the examples described in this invention are free from these drawbacks and demonstrate stable operation during the experiment, have a high average methane conversion of at least 90% in an autothermal reforming reaction of natural/associated gas and a high synthesis gas output of at least 7000 $m^3/m^3$ cat·h.

The invention claimed is:

1. A catalyst prepared by co-precipitation for the conversion of natural/associated gas to synthesis-gas in an autothermal reforming process, having a specific surface area in a calcined state of 20 to 50 $m^2/g$ of catalyst and a specific surface area of nickel metal after reduction of the catalyst of 8 to 11 $m^2/g$, an average nickel metal particles of 3 to 8 nm, and a dispersion of nickel metal particles within the catalyst of 10 to 16%, the catalyst comprising from 5 to 15 wt. % of nickel based on the weight of the calcined catalyst, and a support having a specific surface area of 40 to 120 $m^2/g$ and a support pore volume of 0.2 to 0.4 $cm^3/g$, wherein the support is selected from a mixture of zirconia and ceria; or magnesium oxide, ceria, and zirconia.

2. The catalyst of claim 1, further comprising a promoter selected from the group of palladium and ruthenium, in an amount of 0.01 to 0.5 wt. %.

3. A method for preparing a catalyst for the conversion of natural/associated gas to synthesis gas in an autothermal reforming process according to claim 1 by co-precipitating with ammonium hydroxide from a solution comprising nickel, cerium, and zirconium precursors and distilled water or from a solution comprising nickel, cerium, zirconium, magnesium precursors and distilled water and having a pH of 8.0-9.0, under agitation at a temperature of 40-45° C. for 1-2 hours, followed by filtration, drying at a temperature of 100-110° C. for 6-8 hours, and calcining at a temperature of 400-650° C. for 4-6 hours.

4. A catalyst prepared by co-precipitation for the conversion of natural/associated gas to synthesis-gas in an autothermal reforming process, having a specific surface area in a calcined state of 20 to 50 $m^2/g$ of catalyst and a specific surface area of nickel metal after reduction of the catalyst of 8 to 11 $m^2/g$, an average nickel metal particles of 3 to 8 nm, and a dispersion of nickel metal particles within the catalyst of 10 to 16%, the catalyst comprising from 5 to 15 wt. % of nickel based on the weight of the calcined catalyst, and a support having a specific surface area of 40 to 120 $m^2/g$ and a support pore volume of 0.2 to 0.4 $cm^3/g$, wherein the support is selected from a mixture of zirconia and ceria; or magnesium oxide, ceria, and the balance being zirconia, and wherein the catalyst further comprises a promoter selected from the group of palladium and ruthenium, in an amount of 0.01 to 0.5 wt. %, and wherein the conversion is at least 90% with a synthesis gas output of at least 7,000 $m^3/m^3_{cat}$·h.

5. The catalyst of claim 1, wherein the conversion is at least 90%.

6. The catalyst of claim 1, wherein a synthesis gas output of at least 7,000 $m^3/m^3_{cat}$·h.

7. The catalyst of claim 1, wherein the support is the mixture of zirconia and ceria.

8. The catalyst of claim 1, wherein the support is the mixture of magnesium oxide, ceria, and zirconia.

* * * * *